US008549767B2

(12) United States Patent
Brady

(10) Patent No.: US 8,549,767 B2
(45) Date of Patent: Oct. 8, 2013

(54) APPARATUS FOR HOLDING AND ALIGNING A FLAT MATERIAL

(76) Inventor: John Brady, Aliso Viejo, CA (US)

( * ) Notice: Subject to any disclaimer, the term of this patent is extended or adjusted under 35 U.S.C. 154(b) by 229 days.

(21) Appl. No.: 13/214,174

(22) Filed: Aug. 20, 2011

(65) Prior Publication Data

US 2012/0042531 A1 Feb. 23, 2012

Related U.S. Application Data

(60) Provisional application No. 61/401,794, filed on Aug. 20, 2010.

(51) Int. Cl.
*G01B 5/25* (2006.01)

(52) U.S. Cl.
USPC .............................................. 33/623; 33/645

(58) Field of Classification Search
USPC .................................. 33/562, 613, 623, 645
See application file for complete search history.

(56) References Cited

U.S. PATENT DOCUMENTS

| | | | | |
|---|---|---|---|---|
| 3,018,729 | A * | 1/1962 | Cerullo | 33/623 |
| 4,342,155 | A * | 8/1982 | Waldron | 33/623 |
| 5,485,679 | A * | 1/1996 | Ternes | 33/623 |
| 8,250,774 | B2 * | 8/2012 | Townsend et al. | 33/613 |
| 2005/0204574 | A1 * | 9/2005 | Bigelow | 33/623 |
| 2010/0011602 | A1 * | 1/2010 | Houssian et al. | 33/613 |

* cited by examiner

*Primary Examiner* — G. Bradley Bennett
(74) *Attorney, Agent, or Firm* — Ariel Bentolila

(57) ABSTRACT

An apparatus comprises a planar member comprising a top side, a bottom side comprising a flat surface and at least one aperture comprising a defined shape. At least one alignment tab comprises a top portion, a middle portion and a bottom portion. The middle portion comprises the defined shape and is configured to move vertically within the aperture. The top portion comprises a hook structure being configured to engage the top side to limit a downward movement of the alignment tab. The bottom portion comprises a vertical facing side being configured to engage an edge of a flat material. The apparatus is operable to align the flat material relative to the planar member by engaging the edge of the flat material with the vertical facing side and a vertical movement of the alignment tab enables the planar member to rest flat on the first flat material.

20 Claims, 8 Drawing Sheets

APPARATUS FOR HOLDING AND ALIGNING A FLAT MATERIAL

CROSS-REFERENCE TO RELATED APPLICATIONS

The present Utility patent application claims priority benefit of the [U.S. provisional application for patent Ser. No. 61/401,794, titled "Device with Movable Alignment Tab for Planer Surfaces", filed on Aug. 20, 2010 under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to mechanical connection devices. More particularly, the invention relates to movable alignment tabs for planar surfaces.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The manufacture of products often requires cutting material with many different shapes and sizes. Some manufacturers of rulers/templates show users how to tape their rulers/templates together to cut or mark larger continuous shapes that are combinations of their smaller rulers/templates. Those skilled in the art of crafts such as quilting and/or scrapbooking use many tools that include planer surfaces such as various rulers or templates to accurately mark or cut material. A user may slide the lower surface of a ruler or template that incorporated the alignment mechanism over the material. A user may initiate with the alignment mechanism separated from the material and move it towards a selected edge of the material until the perpendicular portion of the alignment mechanism caught the edge of the material. Once in the selected orientation the user may press down on the ruler or template and the alignment mechanism may be pressed up into the cavity or hole. This maintains the planer surface in even contact with the surface of the material and the user may then mark or cut along the edge(s) of the ruler or template without shifting the material.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
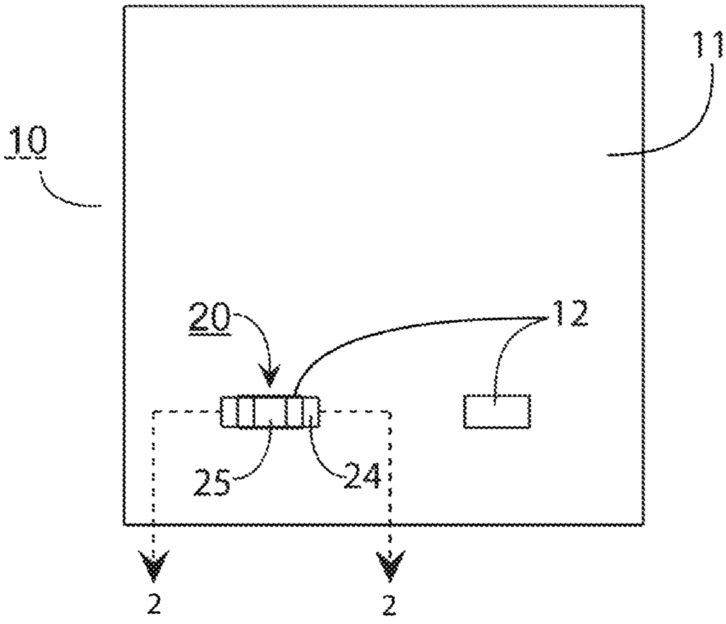
FIG. 1 illustrates an example device comprising a planer structure and movable alignment tab, in accordance with the present invention.

Unless otherwise indicated illustrations in the figures are not necessarily drawn to scale.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms “a,” “an,” and “the” include the plural reference unless the context clearly dictates otherwise. Thus, for example, a reference to “an element” is a reference to one or more elements and includes equivalents thereof known to those skilled in the art. Similarly, for another example, a reference to “a step” or “a means” is a reference to one or more steps or means and may include sub-steps and subservient means. All conjunctions used are to be understood in the most inclusive sense possible. Thus, the word “or” should be understood as having the definition of a logical “or” rather than that of a logical “exclusive or” unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to “one embodiment,” “an embodiment,” “example embodiment,” “various embodiments,” etc., may indicate that the embodiment(s) of the invention so described may include a particular feature, structure, or characteristic, but not every embodiment necessarily includes the particular feature, structure, or characteristic. Further, repeated use of the phrase “in one embodiment,” or “in an exemplary embodiment,” do not necessarily refer to the same embodiment, although they may.

As is well known to those skilled in the art many careful considerations and compromises typically must be made when designing for the optimal manufacture of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Embodiments of the present invention will be described providing a way to easily align a planer surface of an object in an orientation with another object without leaving anything to obstruct the planer surface after alignment. Examples of where this may be beneficial include, but are not limited to, aligning a planer surface to a material such as paper or fabric wherein the planer surface may lie flat on the material thereby holding it firmly in place after alignment. The present invention may also be beneficial for aligning and connecting two planer surfaces to form one larger, continuous flat unobstructed planer surface.

A movable alignment tab will be described that can be movably attached to the planer surface of an object and a cavity or hole formed in the planer surface such that the alignment tab moves between positions where it extends below the planer surface or moves up into the cavity. The alignment mechanism may be formed such that when the movable alignment tab is in the down/extended position, below the planer surface, one portion is perpendicular to the planer surface. When used to align a material, such as, but not limited to, paper or fabric which can vary in thickness, the movable alignment tab would adjust to the thickness of the material when it comes into contact with a flat work surface the material is placed on. The perpendicular portion will extend just enough to catch and align the materials edge and the planer surface of the object would be in full contact with the material. When used in a device to connect two planer surfaces the movable alignment tab would be moved fully into the cavity or hole by contact with the two planer surfaces, thereby leaving the connected planer surfaces unobstructed There are many uses anticipated for embodiments of the present invention including, but not limited to aligning a planer surface in a suitable orientation with material such as paper or fabric.

Another exemplary use for embodiments of the present invention is for aligning and connecting a multiplicity of planer surfaces to form a larger, unobstructed planer surface. A non-limiting example for implementation is aligning and connecting one-eighth inch thick transparent plastic rulers and/or templates commonly used in crafts such as quilting. It is to be appreciated that one may also align and connect thicker or thinner objects such as mirrors that include a flat planer surface. It is common for quilters to need different sizes and shapes of rulers during different stages of the quilt making process. As more and more pieces are sewn together and as the quilt grows larger it becomes more useful to have longer or wider rulers but it is impractical to carry or store such large rulers. Quilters often find it difficult to transport the needed shapes and sizes of rulers when taking classes or attending quilt retreats.

It is therefore convenient to be able to align and connect a multiplicity of smaller rulers and/or templates together when extra length or width is needed but to be able to take them apart for easy transportation and/or storage. For this purpose embodiments of the present invention may be incorporated into a connection device that includes a planer surface. The planer surface includes a movable alignment tab formed in accordance with the present invention. The movable alignment tab may include an angled portion opposite the perpendicular portion. The connection device may also include a minimum of two suction cups wherein a minimum of one suction cup may be adhered to the upper surface of the associated ruler or rulers. The user then slides the planer surface of the connection device along the upper surface of a first ruler so that the perpendicular portion of the alignment mechanism contacts a selected edge of the first ruler. The connection device can also be formed to include a lip extending below the planer surface of the connection device by up to the same amount as the thickness of the ruler, typically one-eighth of an inch. The lip may also be used to align the connection device to an adjacent edge of the ruler thereby aligning the connection device in a suitable orientation with the first ruler. The user may then press one or more suction cups down onto the upper surface of the first ruler which presses a portion of the planer surface of the connection device down against the upper surface of the ruler and adheres the connection device to it in a suitable orientation.

The user may then slide a selected edge of a second ruler against the edge of the first ruler which the connection device is aligned. The selected edge of the second ruler may come into contact with the angled portion of the alignment mechanism thereby forcing the alignment mechanism up into the cavity or hole thereby moving it out of the way such that the edges of the two rulers can freely contact one another. The user may also align an adjacent edge of the second ruler with the lip edge of the connection device thereby aligning the rulers laterally and horizontally. The user may then press down on the one or more remaining suctions cups, which press a portion of the planer surface of the connection device down against the upper surface of the second ruler. The upper and lower surfaces of the two rulers may then be connected and the lower surfaces may form a continuous and unobstructed planer surface representing the sum of their individual surfaces.

Manufacturers of rulers and templates used in the quilting and crafts industries commonly use acrylic sheets that they laser cut into a suitable shape. This also makes it easy to cut indentations or holes during this process. An embodiment of the present invention includes a minimum of one planer surface that includes extensions acting as guide pins which extend below the planer surface and that fit into the indentations or holes formed in the rulers/templates. The indentations/holes can be of any shape such as, but not limited to, round, square, triangle or rectangle. The guide pins can be formed to fit into the indentations/holes such that the embodiment of the present invention may be aligned at a suitable orientation with respect to the ruler/template.

An embodiment of present invention also includes a minimum of two suction cups that a user can adhere to the upper surface of the associated rulers/templates when connected. There may be a minimum of one indention or hole formed in the associated ruler(s)/template(s) but the embodiment may have a minimum of two indentations and/or holes in the associated ruler(s)/template(s). Inserting the correct extensions/guide pins of the present invention into the indentations/holes formed in the first ruler/template aligns it at a suitable orientation which allows insertion of the other extensions/guide pins into the indentations/holes formed in the second ruler/template when it is aligned at a suitable orientation with the first ruler/template. Typically suitable orientation occurs when the edges of the first ruler/template are aligned with the edges of the second ruler/template thereby forming a larger ruler/template while leaving the edges unobstructed.

Embodiments of present invention may also be formed for accommodating rulers/templates not having holes or indentations. The device may include a movable insert wherein the extensions/guide pins can be moved from a position wherein they extend below the lower planer surface of the connecting device or may be moved upward to a position where they no longer extend below the lower planer surface of the connecting device. Furthermore, this configuration enables connection of two rulers/templates not configured with holes or indentations.

FIG. 1 illustrates an example device comprising a planer structure and movable alignment tab, in accordance with the present invention.

A device 10 can be formed of material such as plastic, metal or wood and may be transparent or opaque. The device 10 includes a planer structure 11. The planer structure 11 has an upper surface and a lower surface. The lower surface of the planer structure 11 may be configured as flat. In embodiments such as the one shown in FIG. 1, the planer structure 11 is generally rectangular in shape. The corners of the planer structure 11 may be substantially sharp as shown in FIG. 1, or they may be substantially rounded. It will be appreciated that the planer structure 11 of the device 10 may be a shape other than rectangular, e.g., square or triangular. The planer structure 11 includes a minimum of one hole noted as a hole 12 into which a minimum of one movable alignment tab noted as a movable alignment tab 20 can be inserted. The hole 12 can be any known shape, e.g., round, square, triangular or rectangular as shown in FIG. 1. The movable alignment tab 20 can be any shape that is complimentary to the hole and allowing the movable alignment tab 20 to move freely in the vertical direction within the hole 12, but not move freely in the horizontal direction.

Figure 2:
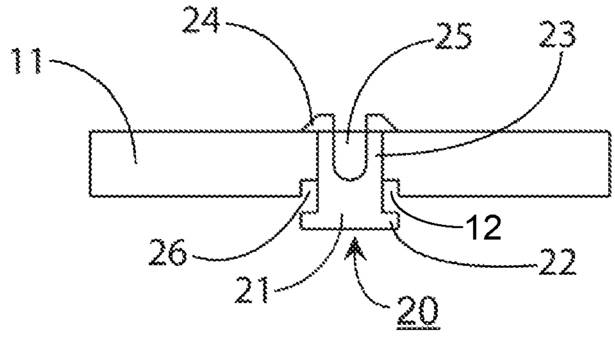
FIG. 2 illustrates an example cross section of the planer structure through a hole with a movable alignment tab inserted, in accordance with an embodiment of the present invention.

FIG. 2 illustrates an example cross section of the planer structure 11 through one of the holes 12 with movable alignment tab 20 inserted, in accordance with an embodiment of the present invention.

The movable alignment tab 20 includes a lower portion 21 that a material or object may be aligned against when using the device 10. The movable alignment tab 20 further comprises a minimum of one extension noted as a horizontal extension 22 that extends horizontally from a minimum of one side of the lower portion 21. The movable alignment tab 20 also includes a minimum of one portion noted as an extension portion 23 that extends vertically from the lower portion 21 with a minimum of one hook noted as a hook 24 formed at the top of the extension portion 23. In an embodiment shown in FIG. 2, the movable alignment tab 20 includes lower portion 21, two horizontal extensions 22, two vertical extension portions 23 with two hooks 24 formed at their tops. The embodiment also includes a gap 25 in between the two vertical extension portions 23. In the embodiment shown in FIG. 2, the gap 25 enables the vertical extension portions 23 to squeeze together when the movable alignment tab 20 is inserted into the hole 12 from the bottom of the planer structure 11. Once the hooks 24 pass the top of the planer structure 11 they spread apart thereby keeping the movable alignment tab 20 from exiting out the bottom of the planer structure 11. As shown in FIG. 2, the hole 12 in the planer structure may be formed with a minimum of one partial indentation noted as a partial indentation 26.

FIG. 2 illustrates the movable alignment tab 20 of the device 10 in its lower configuration within the planer structure 11.

Figure 3:
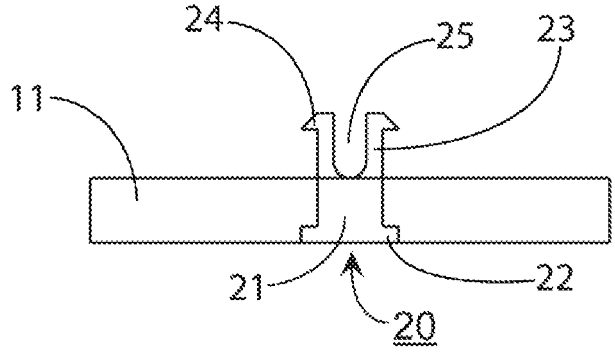
FIG. 3 illustrates a movable alignment tab at its maximal position, in accordance with an aspect of the present invention.

FIG. 3 illustrates movable alignment tab 20 at its maximal position, in accordance with an aspect of the present invention.

At its maximal position, the horizontal extensions 22 move into the partial indentations 26 formed in the lower surface of the planer structure 11 as shown in FIG. 2, thereby leaving the lower surface of the planer structure 11 flat and unobstructed. Also the upper surface of the horizontal extension 22 contacts the lower surface of the partial indentation 26 thereby limiting the upward movement of the movable alignment tab 20 and therefore preventing it from moving out of the top of the hole 12. In the embodiment show in FIGS. 2 and 3, the movable alignment tab 20 can move to a lower position shown in FIG. 2, by the force of gravity when the device 10 is held upright, not in contact with any other surface, and configured for its' maximal position shown in FIG. 3. When the device 10 is placed upright on a flat surface, the alignment tab 20 will be moved up by contact with the flat surface. It is to be appreciated that the movable alignment tab 20 may also be held in a minimal position by the inclusion of a spring mechanism allowing the movable alignment tab 20 to be transitioned up into its' maximal position when the device 10 is pressed down on a surface.

Figure 4:
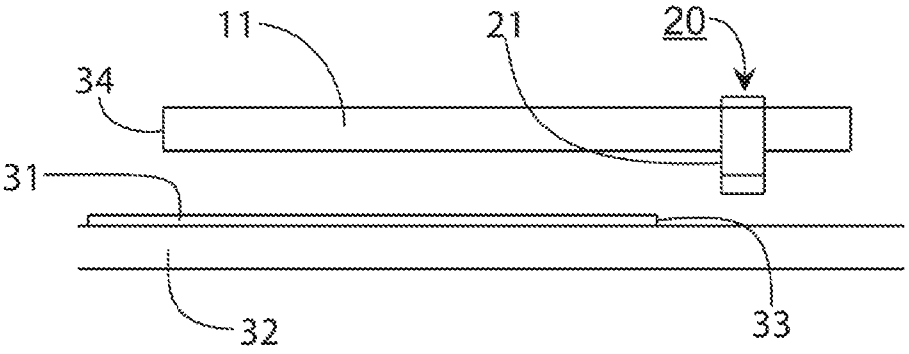
FIGS. 4-6 illustrate a side view of a device for aligning a material with the lower portion of a movable alignment tab, in accordance with an aspect of the present invention.
Figure 5:
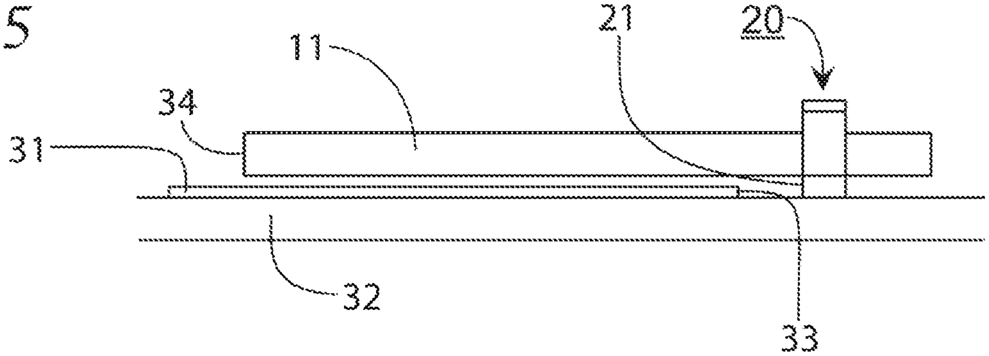
Figure 6:
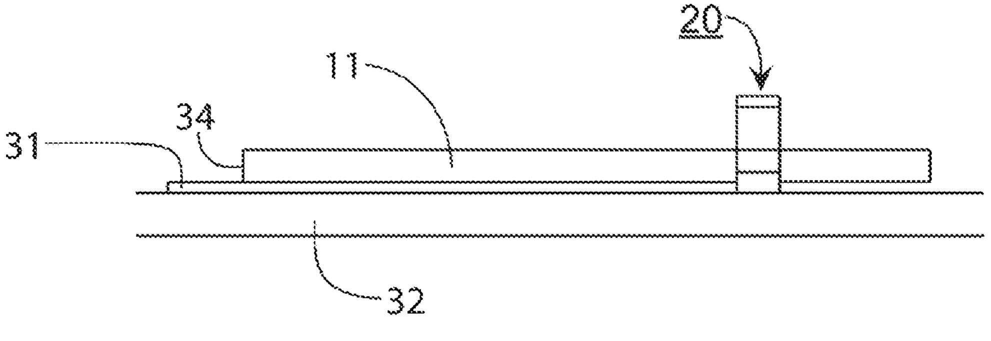

FIGS. 4-6 illustrate a side view of device 10 for aligning a material 31 with the lower portion 21 of the movable alignment tab 20, in accordance with an aspect of the present invention.

The movable alignment tab 20 may be configured at a distance from a minimum of one edge noted as an edge 34 of the planer structure 11. As shown in FIG. 4, the material 31 may be placed on a flat surface 32 preferably covered with a cut resistant material such as those known commonly in the quilting and craft industries as a cutting mat. The movable alignment tab 20 of the device 10 is at its minimal position when the device 10 is placed above the flat surface 32. As shown in FIG. 5, the movable alignment tab 20 may initiate movement up into the hole 12 in the planer structure 11 when the device 10 is lowered onto the flat surface 32. As shown in FIG. 6, the device 10 can be lowered completely down towards the flat surface 32 such that the lower surface of the planer structure 11 contacts the upper surface of the material 31. The user can then slide the device 10 in a direction such that one edge of the lower portion 21 of the movable alignment tab 20 comes into contact with an edge 33 of the material 31. This results in a suitable width of the material 31 to be held firmly under the lower surface of the planer structure 11. Furthermore, this enables a user to cut or mark along the edge 34 of the planer structure 11 with an art knife, rotary cutter or marking device without the fabric shifting as would be the case if the material 31 were not being held firmly by the lower surface of the planer structure 11. It is to be appreciated that the edge 33 may be formed to create decorative edges such as waves or scallops rather than the straight edge shown in FIG. 1.

Figure 7:
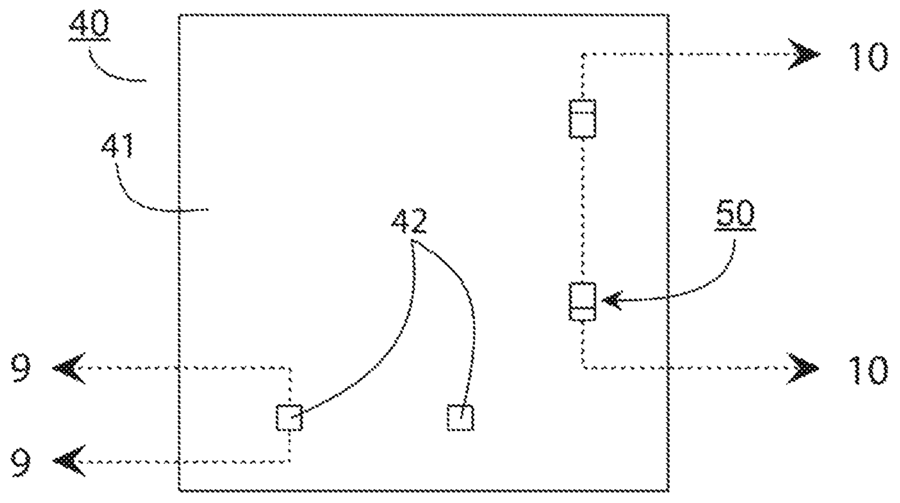
FIG. 7 illustrates an example of a device with a planer structure and a movable alignment tab, in accordance with an embodiment of the present invention.

FIG. 7 illustrates an example of a device 40 with a planer structure 41 and a movable alignment tab 50, in accordance with an embodiment of the present invention.

The device 40 includes planer structure 41. The planer structure 41 has an upper surface and a lower surface. The lower surface of the planer structure 41 may be configured as flat. The planer structure 41 includes a minimum of two holes, noted as a holes 42 into which a minimum of one movable alignment tab noted as a movable alignment tab 50 can be inserted. The holes 42 can be any shape, e.g., round, square, triangular or rectangular as shown in FIG. 7. The movable alignment tab 50 can be any shape that is complimentary to the hole and allowing the movable alignment tab 50 to move freely vertically within the hole 42, but not horizontally.

Figure 8:
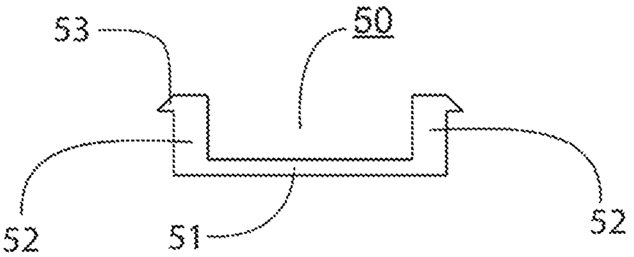
FIG. 8 illustrates movable alignment tab, in accordance with an embodiment of the present invention.

FIG. 8 illustrates movable alignment tab 50, in accordance with an embodiment of the present invention.

The movable alignment tab 50 includes an elongated lower portion 51 that a material or object may be aligned against when using the device 40 (FIG. 7). The movable alignment tab 50 includes a minimum of two portions noted as a portion 52 that extends vertically from the elongated lower portion 51 with a minimum of one hook noted as a hook 53 formed at the top of the vertical extensions 52.

Figure 9:
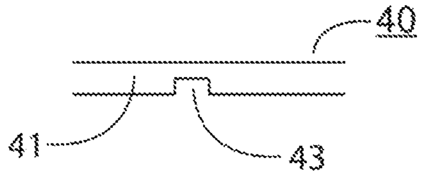
FIG. 9 illustrates a cross section of a hole associated with a planer structure.

FIG. 9 illustrates a cross section of hole 42 (FIG. 7) associated with the planer structure 41.

This view shows that the planer structure 41 includes an elongated indentation 43 located between the holes 42.

Figure 10:
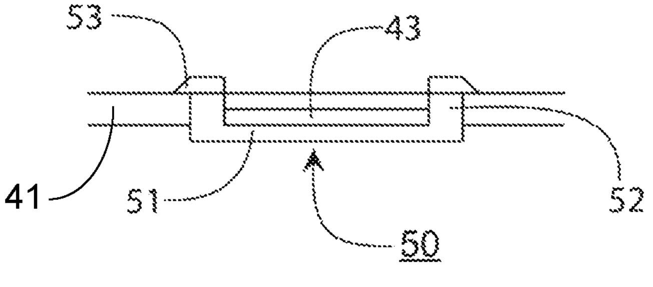
FIG. 10 illustrates a cross section of a planer structure with a movable alignment tab inserted into holes and located at its minimal position, in accordance with an embodiment of the present invention.

FIG. 10 illustrates a cross section of the planer structure 41 with movable alignment tab 50 inserted into holes 42 and located at its minimal position, in accordance with an embodiment of the present invention.

At its minimal position the elongated lower portion 51 of the movable alignment tab 50 extends below the lower surface of the planer structure 41.

Figure 11:
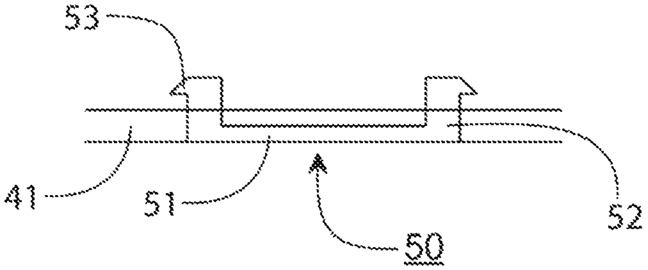
FIG. 11 illustrates a cross section of a planer structure with movable alignment tab positioned into elongated indentation, in accordance with an embodiment of the present invention.

FIG. 11 illustrates a cross section of planer structure 41 with movable alignment tab 50 positioned into elongated indentation 43, in accordance with an embodiment of the present invention.

At its highest position, as shown in FIG. 11, the elongated lower portion 51 moves up into elongated indentation 43 thereby leaving the lower surface of the planer structure 41 flat and unobstructed.

Figure 12:
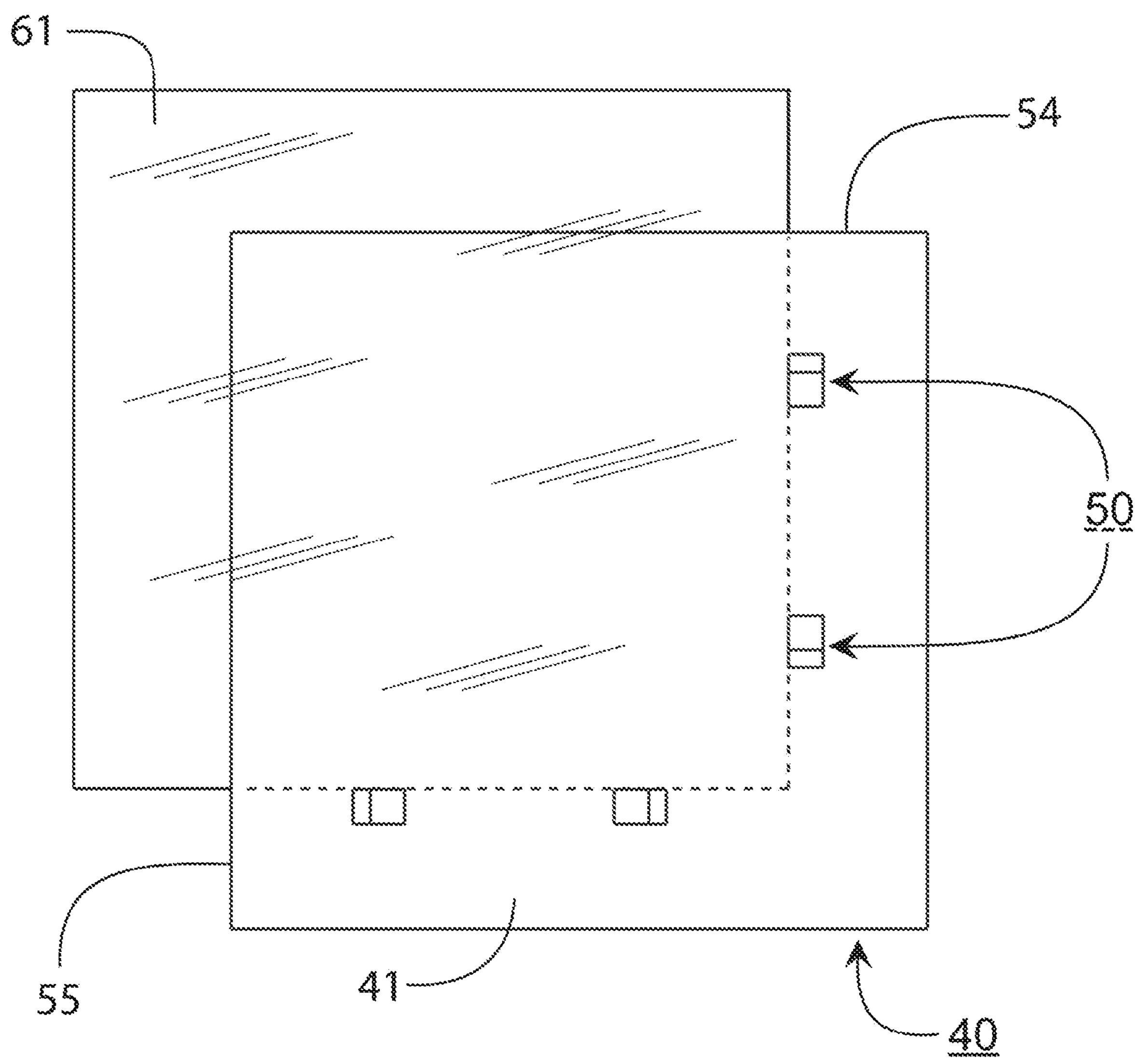
FIG. 12 illustrates a top view of a material aligned against movable alignment tabs located under the lower surface of a planer structure, in accordance with an embodiment of the present invention.

FIG. 12 illustrates a top view of a material 61 aligned against the movable alignment tabs 50 located under the lower surface of the planer structure 41, in accordance with an embodiment of the present invention.

Non-limiting examples for material 61 include fabric and paper. The movable alignment tabs 50 may be located at a selected distance from a minimum of two adjacent edges noted as an adjacent edge 54 and as an adjacent edge 55 of the planer structure 41. A user may cut or mark along adjacent edges 54, 55 of the planer structure 41 with an art knife, rotary cutter or marking device thereby cutting or marking a shape with suitable dimensions. The result of this process as shown in FIG. 12, results in the material being of a square shape. It is to be appreciated that the shape can also be rectangular if the movable alignment tabs are at different distances from their opposite edges. A user may also cut shapes of a suitable dimension such as a triangle by forming the planer structure as a triangle or any other suitable shape. The adjacent edges 54, 55 may also be formed to create decorative edges such as, but not limited to, waves or scallops.

Figure 13:
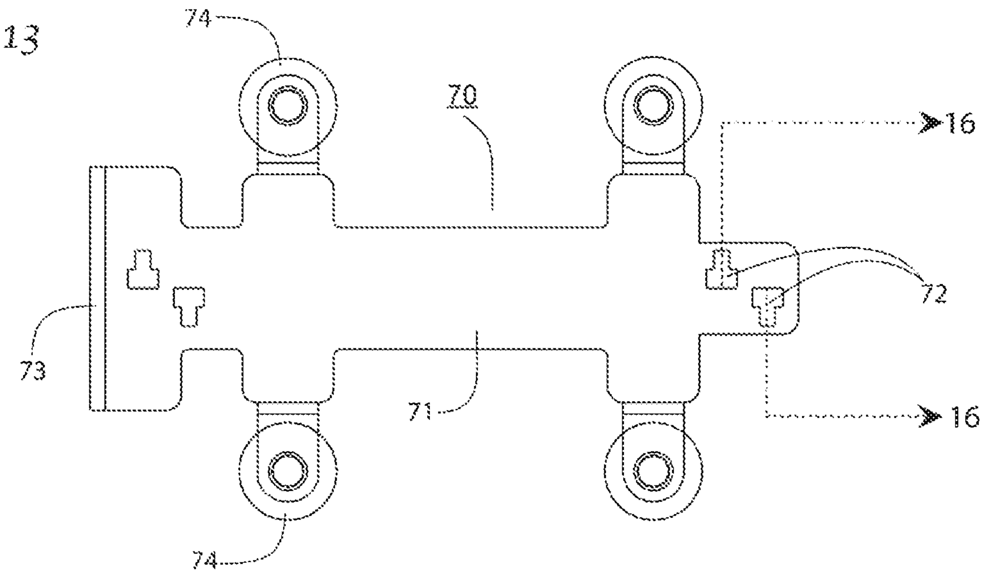
FIG. 13 illustrates a device used to align two planer structures, in accordance with an embodiment of the present invention.

FIG. 13 illustrates a device 70 used to align two planer structures, in accordance with an embodiment of the present invention.

The device 70 includes a planer structure 71. The planer structure 71 includes an upper surface and a lower surface. The lower surface may be configured as flat but can be formed to also include an extension that creates a lip edge 73 that extends downward from the flat lower surface on a minimum of one end of the planer structure 71. The planer structure 71 may be configured with a minimum of one hole, noted as a hole 72. The planer structure 71 also includes a minimum of two suction cups noted as a suction cup 74.

Figure 14:
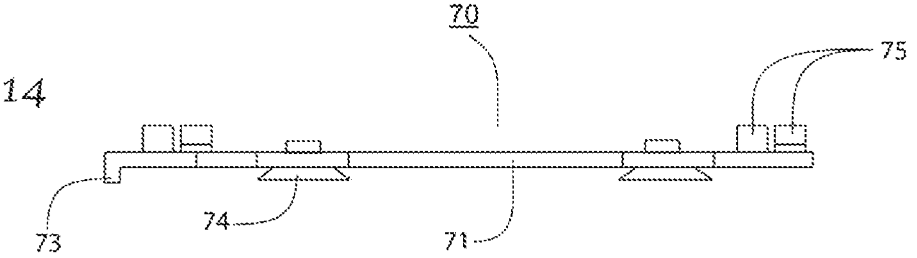
FIG. 14 illustrates a side view of the device described with reference to FIG. 13, in accordance with an embodiment of the present invention.

FIG. 14 illustrates a side view of the device described with reference to FIG. 13, in accordance with an embodiment of the present invention.

This view shows the lip edge 73 that can be formed as part of, or attached to, the planer structure 71. FIG. 14 also shows a multiplicity of covers noted as a hole cover 75 over the holes 72 that can be formed as part of, or attached to planer structure 71.

Figure 15:
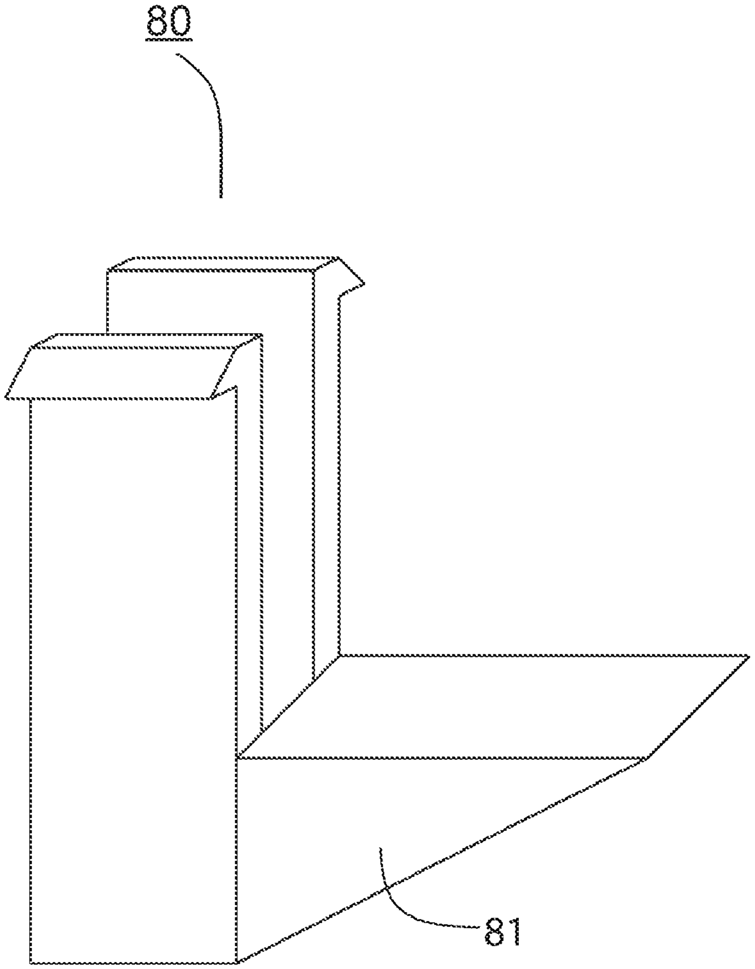
FIG. 15 illustrates a movable alignment tab, in accordance with an embodiment of the present invention.

FIG. 15 illustrates a movable alignment tab 80, in accordance with an embodiment of the present invention.

This embodiment of movable alignment tab 80 is similar to those previously described but also includes an angled lower portion 81 formed to extend horizontally from the opposite lower edge of the movable alignment tab 80 adjacent to the alignment of material.

FIGS. 16-20 illustrate a staggered cross section of the planer structure 71 described with reference to FIG. 13 with a movable alignment tab 80*a* and a movable alignment tab 80*b*, in accordance with an embodiment of the present invention.

Figure 16:
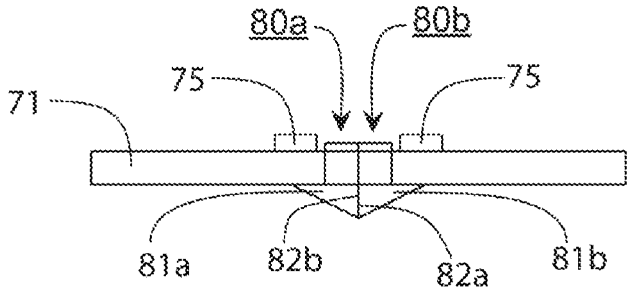
FIGS. 16-20 illustrate a staggered cross section of a planer structure described with reference to FIG. 13 with movable alignment tabs, in accordance with an embodiment of the present invention.
Figure 17:
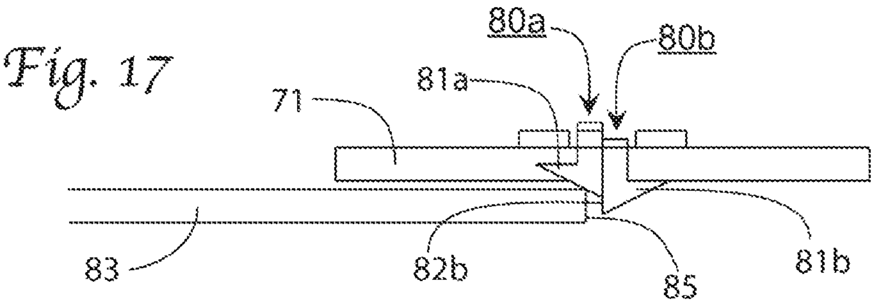
Figure 18:
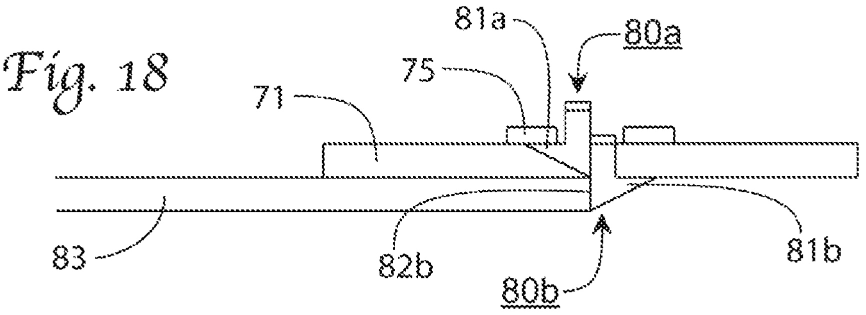

The movable alignment tabs 80*a*, 80*b* can be aligned in the planer structure 71 as shown such that a first planer structure 83 (FIGS. 17-19) may be aligned starting from either direction. It will be appreciated that a user may use a single movable alignment tab 80 and may line up the first planer structure 83 (FIGS. 17-19) from a single direction. As shown in FIGS. 16-20, the movable alignment tabs 80*a*, 80*b* are aligned such that their lower portions as noted by lower portions 82*a*, 82*b*, used to align material, are parallel to one another and their lower angled portions 81*a*, 81*b* extend in opposite directions. FIG. 16 shows the movable alignment tabs in their minimal positions. FIG. 17 shows how a user may slide an edge 85 of first planer structure 83 such as, but not limited to a ruler used in the art of quilting and/or paper crafting, towards the movable alignment tabs 80*a*, 80*b*. The edge 85 of the first planer structure 83 first contacts the angled lower portion 81*a* of one of the movable alignment tabs 80*a* thereby moving the movable alignment tab 80*a* upward. As shown in FIG. 18, first planer structure 83 may move towards the movable alignment tabs 80*a* and 80*b* until its edge 85 contacts with the lower portion 82*b* of the second movable alignment tab 80*b* and the first movable tab 80*a* moves up into the hole 72 in the planer structure 71 of the device 70. In the embodiment shown in FIG. 18, the upper surface of the lower angled portion 81*a* contacts with the lower surface of the hole cover 75 thereby limiting the upper movement of the movable alignment tab 80*a*.

Figure 19:
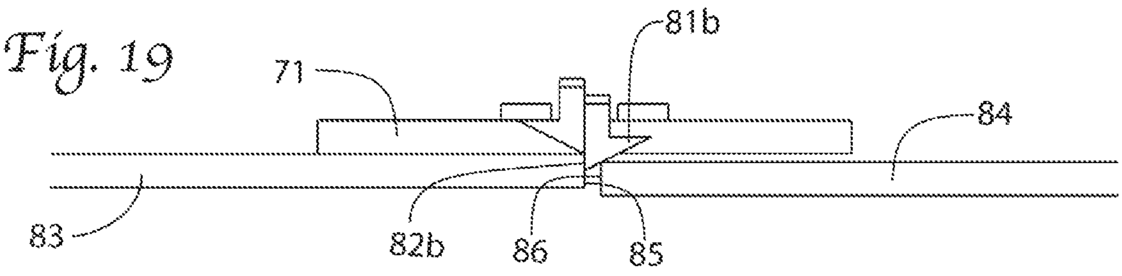
Figure 20:
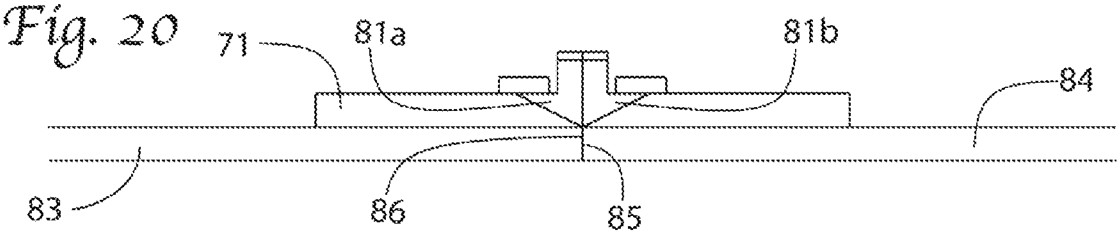

As shown in FIG. 19, a user may then slide an edge 86 of a second planer structure 84 towards the movable alignment tabs 80*a*, 80*b*, and the edge 85 of the first planer structure 83. The edge 86 first contacts the angled lower portion 81*b* of the second movable alignment tab 80*b* thereby starting to move it up into one hole 72 in the planer structure 71. As shown in FIG. 20, a user may continue moving the second planer structure 84 towards the first planer structure 83 until their edges 85, 86 are in contact.

Figure 21:
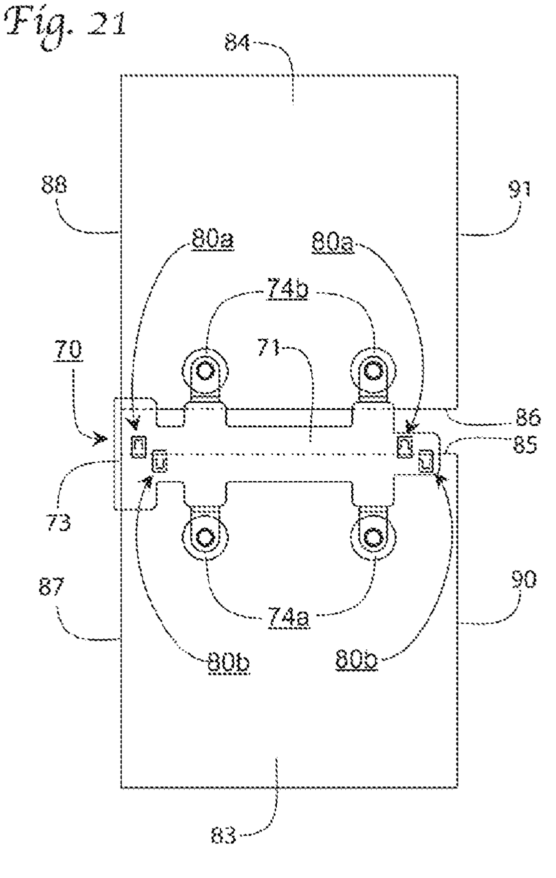
FIG. 21 illustrates a top view of a device for aligning two planer structures with one edge of a first planer structure aligned against the lower portion of two of the movable alignment tabs, in accordance with an embodiment of the present invention.

FIG. 21 illustrates a top view of a device for aligning two planer structures with one edge 85 of the first planer structure 83 aligned against the lower portion 82*a* of two of the movable alignment tabs 80*a*, in accordance with an embodiment of the present invention.

An adjacent edge 87 may be configured for alignment against the lip edge 73 of the planer structure 71. The second planer structure 84 is shown with its edge 86 not contacting with the edge 85 of the first planer structure 83 but its adjacent edge noted as an adjacent edge 88 may be configured for contact with the lip edge 73.

Figure 22:
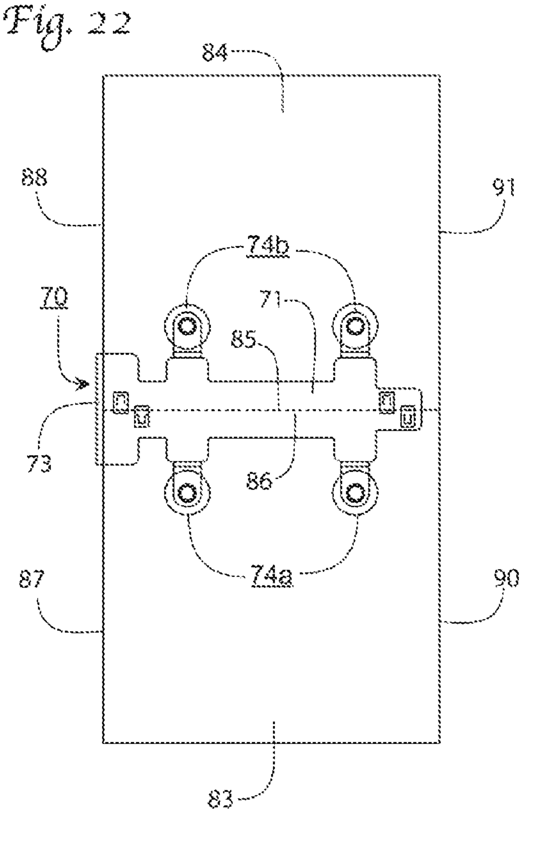
FIG. 22 illustrates a top view with the edges of a first planer structure and a second planer structure contacting with one another, in accordance with an embodiment of the present invention.

FIG. 22 illustrates a top view with the edges 85, 86 of first planer structure 83 and second planer structure 84 contacting with one another, in accordance with an embodiment of the present invention.

The examples shown in FIGS. 21, 22 present device 70 wherein first planer structure 83 and second planer structure 84 of the same width can be aligned and connected such that an edge 90 and an edge 91 form a straight, unobstructed edge. The device includes four movable alignment tabs 80*a*, 80*b* grouped in pairs of two. The pairs are aligned such that their angled lower portions 81*a*, 81*b* are pointing in opposite directions and the front edges of their lower portions 82*a*, 82*b* used for alignment are parallel to one another. The second pair may be aligned in a similar fashion, The two pairs of movable alignment tabs 80*a*, 80*b* may also be configured for alignment such that when a straight edge 85 is aligned to them, straight edge 85 is perpendicular to the lip edge 73 of the planer structure 71. Once the first planer structure 83 is aligned as shown in FIG. 21, the user can press down on the suction cups 74*a* thereby holding the first planer structure 83 in alignment. When the edge 86 of the second planer structure 84 is aligned against the edge 85 of the first planer structure 83 the user can press down on the other suction cups 74*b* thereby holding the second planer structure 84 in alignment. The two pairs of movable alignment tabs 80 press up into the holes 72 formed in the planer structure 71 of the device 70 thereby allowing the lower surfaces of first planer structure 83 and second planer structure 84 to form one continuous and unobstructed flat planer surface as shown in FIG. 20.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of movable alignment tabs according to the present invention will be apparent to those skilled in the art. The invention has been described above by way of illustration, and the specific embodiments disclosed are not intended to limit the invention to the particular forms disclosed. For example, the particular implementation of the suction cups may vary depending upon the particular type of planar material the suction cups are attached to. The suction cups described in the foregoing were directed to plastic implementations; however, similar techniques applied for other materials (e.g. aluminum, etc.) of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. An apparatus comprising:

a planar member comprising a top side, a bottom side comprising a flat surface and at least one aperture comprising a defined shape; and at least one alignment tab comprising a top portion, a middle portion and a bottom portion, said middle portion comprising said defined shape and being configured to move vertically within said aperture, said top portion comprising a hook structure being configured to engage said top side to limit a downward movement of said alignment tab, said bottom portion comprising a vertical facing side being configured to engage an edge of a first flat material, and a horizontal surface being configured to engage a work surface, the apparatus being operable to align the first flat material relative to said planar member by engaging the edge of the first flat material, placed on the work surface, with said vertical facing side while said horizontal surface contacts the work surface and a vertical movement of said alignment tab enables said planar member to rest flat on the first flat material.

2. The apparatus as recited in claim 1, in which said middle portion further comprises two vertical members.

3. The apparatus as recited in claim 2, in which said hook structure comprises hooks being joined to said two vertical members.

4. The apparatus as recited in claim 3, in which said two vertical members are configured to be horizontally compressible to enable said alignment tab to be inserted into said aperture from said bottom side.

5. The apparatus as recited in claim 1, in which said bottom portion further comprises at least one horizontal extension being configured to limit an upward vertical movement of said alignment tab.

6. The apparatus as recited in claim 5, in which said bottom side further comprises a recess being configured to accept said horizontal extension to enable said horizontal surface to be flush with said bottom side.

7. The apparatus as recited in claim 1, further comprising a plurality of alignment tabs and said planar member further comprising a plurality of apertures for said alignment tabs.

8. The apparatus as recited in claim 7, in which said bottom portion further comprises an angular facing side opposing said vertical facing side, said angular facing side being configured to slidingly engage an edge of a flat material to move said alignment tab upwards.

9. The apparatus as recited in claim 8, in which said plurality of apertures are disposed about a line extending along a length of said planar member to position said vertical facing sides on said line.

10. The apparatus as recited in claim 9, in which a first portion of said plurality of alignment tabs are aligned in a first direction and a second portion of said plurality of alignment tabs are aligned in a second direction opposing said first direction.

11. The apparatus as recited in claim 10, in which said vertical facing sides of said first portion of said plurality of alignment tabs are configured to engage the edge of the first flat material and said angular facing side of said second portion of said plurality of alignment tabs are configured to slidingly engage the edge of the first flat material.

12. The apparatus as recited in claim 11, in which said vertical facing sides of said second portion of said plurality of alignment tabs are configured to engage an edge of a second flat material and said angular facing side of said first portion of said plurality of alignment tabs are configured to slidingly engage the edge of the second flat material.

13. The apparatus as recited in claim 12, further comprising a securing mechanism being configured to removably join said planar member to the first flat material and the second flat material.

14. The apparatus as recited in claim 13, in which said securing mechanism comprises suction cups.

15. An apparatus comprising:

means for holding a flat material to a work surface by laying flat against the flat material; and means for engaging an edge of the flat material, said engaging means being disposed in said holding means and configured for vertical movement to align the flat material relative to said holding means and to enable said holding means to rest flat on the flat material.

16. An apparatus comprising:

a planar member comprising a top side, a bottom side comprising a flat surface and a plurality of apertures each comprising a defined shape and an adjacent recess; and a plurality of alignment tabs each comprising a top portion, a middle portion and a bottom portion, said middle portion comprising two vertical members forming said defined shape and being configured to move vertically within a one of said apertures, said top portion comprising a hooks being joined to said two vertical members and being configured to engage said top side to limit a downward movement of said alignment tab, said bottom portion comprising a vertical facing side being configured to engage an edge of a first flat material, a horizontal surface being configured to engage a work surface, and a horizontal extension being configured to fit within said recess and to limit an upward vertical movement of said alignment tab, the apparatus being operable to align the first flat material relative to said planar member by engaging the edge of the first flat material, placed on the work surface, with said vertical facing side while said horizontal surface contacts the work surface and a vertical movement of said alignment tab enables said planar member to rest flat on the first flat material.

17. The apparatus as recited in claim 16, in which said bottom portion further comprises an angular facing side opposing said vertical facing side, said angular facing side being configured to slidingly engage an edge of a flat material to move said alignment tab upwards.

18. The apparatus as recited in claim 17, in which a first portion of said plurality of alignment tabs being aligned in a first direction and a second portion of said plurality of alignment tabs being aligned in a second direction opposing said first direction, said vertical facing sides of said first portion of said plurality of alignment tabs being configured to engage the edge of the first flat material and said angular facing side of said second portion of said plurality of alignment tabs being configured to slidingly engage the edge of the first flat material, said vertical facing sides of said second portion of said plurality of alignment tabs being configured to engage an edge of a second flat material and said angular facing side of said first portion of said plurality of alignment tabs being configured to slidingly engage the edge of the second flat material.

19. The apparatus as recited in claim 18, further comprising a securing mechanism being configured to removably join said planar member to the first flat material and the second flat material.

20. The apparatus as recited in claim 19, in which said securing mechanism comprises suction cups.

* * * * *